United States Patent [19]

Gubiev et al.

[11] Patent Number: 4,576,824

[45] Date of Patent: Mar. 18, 1986

[54] PROCESS FOR MATURING STRONG BEVERAGES

[76] Inventors: Jury K. Gubiev, ulitsa Parshina, 25, korpus 1, kv. 178; Valery V. Krasnikov, ulitsa Festevalnaya, 9, kv. 96; Valentin P. Bakulin, 3 Likha-chevsky pereulik, 7, korpus 1, kv. 19; Mikhail A. Gagarin, ulitsa Profsojuznaya, 35/11, kv. 167; Vladimir V. Ivanov, ulitsa Sivashskaya, 4, korpus 3, kv. 64; Zbignev N. Kishkovsky, ulitsa Begovava, 22, korpus 3, kv. 207, all of Moscow, U.S.S.R.

[21] Appl. No.: 646,625

[22] Filed: Aug. 31, 1984

[51] Int. Cl.⁴ ............................................. C12H 1/22
[52] U.S. Cl. ................................. 426/241; 426/592; 426/494; 217/88; 204/157.62
[58] Field of Search ............... 426/234, 237, 238, 239, 426/247, 248, 592, 494, 330.3, 330.4, 425, 489, 429, 431, 11, 15; 217/88; 204/157.1 R

[56] References Cited

U.S. PATENT DOCUMENTS

| Re. 21,589 | 6/1934 | Krebs et al. | 426/425 |
|---|---|---|---|
| 2,088,585 | 8/1937 | Chambers et al. | 426/238 |
| 2,119,234 | 5/1938 | Krebs et al. | 426/11 |
| 2,132,435 | 6/1934 | Ruman | 426/592 |
| 2,196,193 | 11/1933 | Chambers et al. | 426/238 |
| 2,347,783 | 10/1941 | Krebs | 426/592 |
| 2,415,431 | 2/1947 | Krebs | 426/592 |
| 2,417,505 | 3/1947 | Krebs | 426/592 |
| 4,210,676 | 7/1980 | Dudar et al. | 426/238 |
| 4,350,708 | 9/1982 | Palacios | 426/592 |

FOREIGN PATENT DOCUMENTS

| 2836676 | 3/1979 | Fed. Rep. of Germany | 426/238 |
|---|---|---|---|
| 87105 | 12/1949 | U.S.S.R. | |
| 630292 | 10/1978 | U.S.S.R. | 426/592 |

OTHER PUBLICATIONS

Amerine et al., 1980 The Technology of Wine Making, AVI Publishing Co., Inc., Westport Conn. pp. 280-291; 294-295.

Primary Examiner—Robert Yoncoskie
Assistant Examiner—Carolyn Paden
Attorney, Agent, or Firm—Burgess, Ryan & Wayne

[57] ABSTRACT

A process for maturing strong beverages comprising activation of an oak stave after separation of a matured strong beverage therefrom by a cyclic application of a multimode electromagnetic field of standing waves with a frequency of from 2,000 to 4,500 MHz thereto to a heating temperature of from 35° to 55° C. At the same time, an oxygen-containing medium is purged. As a result of the cyclic application of the multimode electromagnetic field the stave releases the spirit vapors in a residual content thereof ranging from 5 to 10%. Between cycles of application of the multimode electromagnetic field the stave is cooled to a temperature of 15° to 25° C. by means of an oxygen-containing medium. The spirit vapors are entrained by the oxygen-containing medium and condensed. The strong beverage is kept in the activated oak stave. The matured strong beverage is then from the stave.

6 Claims, No Drawings

PROCESS FOR MATURING STRONG BEVERAGES

The present invention relates to the wine technology and, more specifically, to processes for maturing strong beverages,

FIELD OF THE INVENTION

Strong beverages are employed in the food industry, pharmaceutical and other industries.

BACKGROUND OF THE INVENTION

High-quality strong beverages are produced from spirits (brandy, calvados and the like spirits) by of a long maturation in oak barrels (up to 10–15 years and longer) through the walls of which barrels oxygen diffuses and interacts with the alcohol.

During such maturation green alcohols are enriched with wood components (tanning substances), and acquire a characteristic colour, as well as a specific bouquet and taste. The quality of the resulting strong beverage is in a direct relationship to the duration of its maturation (cf. USSR Inventor's Certificate No. 87105).

However, this process for maturing strong beverages is accompanied by inevitable and considerable losses of the starting spirit through evaporation thereof out of pores of an oak barrel (up to 50%), since the process technology does not provide for an outside coating of barrels with sealing materials. Moreover, a long-time maturation of spirits in oak barrels causes a considerable consumption and an inefficient utilization of a high-quality aged oak stave which is a rarely-available item in the wine technology.

In order to avoid losses of spirits from evaporation and to reduce the consumption of oak stave, a tank process for maturing strong beverages has been developed and is now employed on a wide scale (cf. "Basic Rules in the Production of Cognacs"; USSR Ministry of Food Industry, 1978, p. 12–16).

The process involves a special preliminary preconditioning of the oak stave. One of embodiments of this preconditioning resides in that the stave is soaked in alkali solutions at an elevated temperature for a period of several days. Then the soaked stave is placed in a tank, brandy spirit and the latter is matured in the presence of the stave for 3 to 5 years with an intermittent saturation with oxygen. The resulting finished product is separated from the stave. In order to recover the residual spirit from the spent stave, the latter is subjected to a special treatment; for example, it is covered with water, kept for 12 days and the thus-obtained aqueo-alcoholic mixture is distilled. The process is rather time-consuming, the degree of recovery of the residual spirit from the used stave is not high and its quality is but unsatisfactory. Furthermore, the recovery of the residual alcohol from the spent stave is a labour-consuming process as well.

In order to reduce the duration of the ageing process and to improve quality of the brandy spirit, the tank process involves a preliminary (prior to maturation) enrichment of green brandy spirits by wood components (phenolic substances) by conventional methods. Such a method involves heat-treatment of the solution in an enameled vessel with oak stave at a temperature within the range of from 35° to 45° C. for 30 to 50 days.

However, this mode of preliminary enrichment of a brandy spirit with polyphenolic substances, as with other methods, is of a low efficiency, since neither of them enables a considerable reduction of the process duration of maturation of strong beverages.

Known in the art is another process for maturing strong beverages comprising a preliminary (prior to maturation) wetting of oak stave by hydrogen peroxide, followed by activation by a heat-treatment in an oxygen-containing medium under a pressure of 0.314 to 0.490 MPa at a tempeature of from 120° to 150° C. for 12 to 24 hours (cf. USSR Inventor's Certificate No. 798170). Then the activated wooden stave is air-dried and introduced into a brandy spirit which is aged in the presence of the stave for 3 to 5 years. Thereafter, the beverage is separated from the stave. The heat-treatment stage of this process is of rather long duration, deactivation of the antioxidizing ability of polyphenols of the oak wood occurs predominantly on the surface thereof, since deactivation of the antioxidizing ability of inaccessible polyphenols in the inner bulk of the wood as achieved by this process is inefficient. The process does not make it possible to obtain a product with high organoleptic characteristics, neither does it allow the possibility of activation of the used oak stave and a repeated use thereof.

Therefore, the prior art methods do not make it possible to substantially reduce the duration of the process of maturation of strong beverages simultaneously with ensuring high organoleptic properties of the finished product, or to repeatedly utilize the used stave.

SUMMARY OF THE INVENTION

It is an object of the present invention to provide such a process for maturing strong beverages which would make it possible to considerably reduce the duration of the process of maturation of strong beverages while obtaining high organoleptic characteristics of the finished product and to repeatedly use a spent stave.

These and other objects of the present invention are accomplished by a process for maturing strong beverages comprising activation of an oak stave by a heat-treatment thereof in the presence of an oxygen-containing medium, allowing a strong beverage to remain in the presence of the activated oak stave and separation of the matured strong beverage from the stave, wherein, according to the present invention, the stave after separation of the matured strong beverage is subjected to a heat-treatment by subjecting it to a cyclic effect of a multimode electromagnetic field of standing waves with a frequency of from 2,000 to 4,500 MHz to a heating temperature of 35° to 55° C. simultaneously with purging an oxygen-containing medium to recover spirit vapours from the stave in a residual content of the spirit therein of 5 to 10%. Between the cycles of application of a multimode electromagnetic field the stave is cooled to a temperature of 15° to 25° C. by the oxygen-containing medium and the spirit vapours are entrained by the oxygen-containing medium and condensed.

As a rule, in the prior art processes the spent stave contains 25 to 70% of the spirit.

The application of a multimode electromagnetic field of standing waves (SHF-power supply) for the heat-treatment of an oak stave, due to selectivity of dissipation of the electromagnetic energy, makes it possible to create high local thermodynamic potentials between shells of the stave walls, thus contributing to an intensive extraction of phenolic compounds dissolved in the spirit towards its outer surface and oxidation of these compounds in the oxygen-containing medium with which the stave is purged, for example air. Upon cooling of the stave, without application of a SHF-power supply, by an oxygen-containing medium to a temperature of 15° to 25° C. an effusive penetration of the oxygen-containing medium into the stave microcapillaries, whereby conditions are provided for oxidation of inner polyphenols with their inactivated antioxidizing ability during the SHF-radiation. In this manner the inner polyphenols are also oxidized to readily soluble substances, they are dissolved in the spirit and, together with the latter, they are moved by thermodiffusion to the external surface of the stave in the form of a liquid and vapours. At the interface between the solid body (stave) and the gas the spirit is evaporated, entrained by the oxygen-containing medium while the inner polyphenols oxidized to readily soluble substances are deposited on the stave surface thus rendering it activated.

The lower temperature limit, i.e. 35° C., to which the stave is heated is determined by the intensity of the process of extraction of phenolic compounds which is proportional to the temperature gradient. The upper temperature limit of 55° C. is defined by quality characteristics of the finished beverage.

As it has been already mentioned hereinbefore, the cyclic application of a multimode electromagnetic field of standing waves is effected to a residual content of the spirit in the stave of from 5 to 10% which is dictated by an economic expediency of the use of the SHF-power supply.

The process for maturing strong beverages according to the present invention makes it possible:
to lower the cost of the final product due to repeated use of the spent oak stave in the process of maturing of strong beverages;
to considerably intensity the process of maturation of strong beverages and reduce the time of maturation thereof to 10–15 months;
to combine the process of activation of the spent stave with the process of recovery of a residual spirit therefrom to a final content of 5–10%;
to improve organoleptic characteristics of the finished product;
to develop a waste-free technology (the repeatedly treated stave wherefrom phenolic compounds have been extracted is useful as a starting material for the wood-working industry);
to accelerate the process of thermoactivation of the stave and reduce its duration from 12–24 hours to 30 minutes.

DETAILED DESCRIPTION OF THE INVENTION

The process for maturing strong beverages according to the present invention is simple and practiced in the following manner.

After separation of a matured strong beverage the spent oak stave with a residual content of the spirit of 25 to 70% is placed into a sealable vessel made, for example, from polytetrafluoroethylene (Teflon) or glass and subjected to a heat-treatment by way of a cyclic application of a multimode electromagnetic field of standing waves with a frequency of 2,000 to 4,500 MHz to a temperature of 35° to 55° C., and simultaneously purging an oxygen-containing medium therethrough.

The heating time is determined by the power of the SHF unit employed for radiation and is calculated by the heating energy of the stave, spirit and by the energy of the spirit migration and the energy of the phase transition. The heating duration is within the range of from 60 to 300 seconds.

During such application of the electromagnetic field the spirit from the stave diffuses towards its surface in the form of a liquid and vapour, evaporates and is entrained by the purging oxygen-containing medium.

After discontinuation of the effect of the multimode electromagnetic field the stave temperature is lowered to 15°–25° C. by means of heat-exchange with the purging oxygen-containing medium. Then the stave is again subjected to the effect of the multimode electromagnetic field, followed by cooling thereof. The spirit vapours are entrained by the oxygen-containing medium, passed into a cooler and condensed therein. The condensed spirit is then fed into a collecting vessel.

The above-described heat-treatment of the stave is carried out until a residual content of the spirit therein is within the range of from 5 to 10%.

The thus-activated stave is used for ageing of strong beverages by way of maturing them in the presence of this stave. Then the matured strong beverage is separated from the used stave.

For a better understanding of the present invention the following specific examples are given hereinbelow by way of illustration.

EXAMPLE 1

A spent oak stave with a spirit content of 25% after separation of the matured strong beverage is placed in a sealed vessel made of Teflon and subjected to a cyclic heat-treatment by a multimode electromagnetic field of standing waves energized at the frequency of 2,000 MHz to the heating temperature of 35° C. and simultaneously purging with air. The heat-treatment time is 60 seconds per cycle, the total duration of the heat-treatment is 15 minutes. Between cycles of application of the electromagnetic field the stave is air-cooled to the temperature of 25° C. During the heat-treatment vapours of the spirit are recovered from the stave. The cyclic effect of the electromagnetic field lasts until the residual content of the spirit in the stave is made equal to 5%. The spirit vapours are entrained by the oxygen-containing medium, passed into a cooler, wherein they are condensed and then fed into a collecting vessel. The strong beverage is matured in the presence of the activated stave with the residual content of the spirit of 5% for 10 months, whereafter the matured strong beverage is separated from the stave.

The quality of the finished product has the following characteristics:

| | |
|---|---|
| content of total phenols, mg/l | 210.0 |
| lignin, mg/l | 360.0 |
| aromatic aldehydes, mg/l | 12.6 |
| degree of oxidation of polyphenols, % | 41.5 |

EXAMPLE 2

A spent oak stave with a spirit content of 70% after separation of the strong beverage is placed into a sealed glass vessel and subjected to a cyclic heat-treatment by a multimode electromagnetic field of standing waves energized at the frequency of 4,500 MHz to the heating temperature of 45° C. and simultaneously purging with air. The time of the heat-treatment per cycle is 180 seconds, the total duration—20 minutes. Between cycles of application of the electromagnetic field the stave is cooled by air to the temperature of 20° C. During the heat-treatment the spirit vapours are recovered from the stave. The cyclic effect of the electromagnetic field is continued till the residual content of the spirit in the stave is 10%. The spirit vapours are entrained by the oxygen-containing medium, fed into a cooler, wherein they are condensed and then delivered into a collecting vessel.

The strong beverage is subjected to maturation in the presence of the activated stave with the residual content of the alcohol of 10% for 12 months, whereafter the matured strong beverage is separated from the stave.

The finished product has the following quality characteristics:

| | |
|---|---|
| content of total phenols, mg/l | 305.0 |
| lignin, mg/l | 325.0 |
| aromatic aldehydes, mg/l | 13.8 |
| degree of oxidation of polyphenols, % | 40.0 |

EXAMPLE 3

A spent oak stave with the spirit content of 50% after separation of the matured strong beverage is placed into a sealed Teflon vessel and subjected to a cyclic heat-treatment of application of a multimode electromagnetic field of standing waves energized at the frequency of 3,500 MHz to the heating temperature of 55° C. simultaneously with purging of air. The time of the heat-treatment per cycle is 300 seconds, the total duration—30 minutes. Between cycles of application of the electromagnetic field the stave is cooled to the temperature of 15° C. During the heat-treatment the spirit vapours are recovered from the stave. The cyclic application of the electromagnetic field is continued till the residual content of the spirit in the stave is 8%. The spirit vapours are entrained by the oxygen-containing medium and delivered into a cooler, wherein they are condensed and then supplied into a collecting vessel.

The strong beverage is kept in the presence of the activated oak stave with the residual spirit content of 8% for the period of 15 months, whereafter the finished strong beverage is separated from the stave.

The finished product has the following quality characteristics:

| | |
|---|---|
| content of total phenols, mg/l | 380.0 |
| lignin, mg/l | 305.0 |
| aromatic aldehydes, mg/l | 14.3 |
| degree of oxidation of polyphenols, % | 40.0 |

What is claimed is:

1. A process for activating an oak stave which has been used to mature strong alcoholic spirits which comprises:
    separating the stave from contact with the spirits and cyclically treating the stave by heating the stave, in the presence of an oxygen containing gaseous medium, by application of a multimode electromagnetic field of standing waves with a frequency of from 2,000 to 4,500 MHz, to a temperature in the range of from 35° to 55° C. and cooling the stave to a temperature of from 15° to 25° C. in the presence of an oxygen containing gaseous medium and repeating the treatment until the stave has a residual spirit content of from 5 to 10%.

2. The process of claim 1, wherein the oxygen containing medium is a gas containing oxygen.

3. The process of claim 2, wherein the gas is air.

4. A process for maturing strong spirits which comprises:
    activating an oak stave which has been used in maturing strong spirits by separating the stave from contact with the strong spirits and alternately heating the stave to a temperature of 35° to 55° C. in a multimode electromagnetic field of standing waves, having a frequency range of 2,000 to 4,500 MHz, in the presence of an oxygen containing gaseous medium and cooling the heated to a temperature in the range of 15° to 25° C. in the presence of an oxygen containing gaseous medium to provide an activated stave having a residual spirit content of from 5 to 10% and maturing the strong spirits in contact with the activated stave.

5. The method of claim 4, wherein the oxygen containing medium is a gas containing oxygen.

6. The method of claim 5, wherein the gas is air.

* * * * *